United States Patent [19]
Taniguchi et al.

[11] Patent Number: 5,403,454
[45] Date of Patent: Apr. 4, 1995

[54] HEAT-SHRINKABLE TUBE

[75] Inventors: Kazuo Taniguchi; Tetsuo Murakami, both of Nagahama, Japan

[73] Assignee: Mitsubishi Plastics Industries Limited, Tokyo, Japan

[21] Appl. No.: 276,607

[22] Filed: Jul. 18, 1994

Related U.S. Application Data

[60] Division of Ser. No. 17,432, Feb. 12, 1993, Pat. No. 5,368,811, which is a continuation of Ser. No. 766,070, Sep. 27, 1991, abandoned.

Foreign Application Priority Data

Sep. 27, 1990 [JP] Japan ................... 2-255398

[51] Int. Cl.$^6$ ............................. H05F 3/00
[52] U.S. Cl. ..................... 204/164; 204/165
[58] Field of Search ................... 204/164, 165

[56] References Cited

U.S. PATENT DOCUMENTS 4,488,954 12/1984 Hatada et al. .................. 204/165
5,026,463 6/1991 Dinter et al. .................... 204/164

Primary Examiner—John Niebling
Assistant Examiner—Kishor Mayekar
Attorney, Agent, or Firm—Oblon, Spivak, McClelland, Maier & Neustadt

[57] ABSTRACT

A heat-shrinkable polyester tube, which is a tube having heat shrinkability imparted by subjecting an unstretched tube made of a thermoplastic polyester resin to tubular stretching, and which has a crystallinity of not higher than 20% and a shrinkage of more than 5% and not more than 26% in the longitudinal direction (MD) and a shrinkage of at least 25% in the radial direction (TD).

1 Claim, 2 Drawing Sheets

HEAT-SHRINKABLE TUBE

This is a division of application Ser. No. 08/017,432, filed on Feb. 12, 1993, now U.S. Pat. No. 5,368,811, an FWC of application Ser. No. 07/766,070, filed on Sep. 27, 1991, now abandoned.

The present invention relates to a thermoplastic polyester tube having heat shrinkability imparted thereto. Particularly, it relates to a heat-shrinkable polyester tube suitable as an exterior covering or sheathing for electronic parts or components including capacitors such as aluminum capacitors or tantalum capacitors.

BACKGROUND OF THE INVENTION

Heretofore, as the exterior covering or sheathing for electronic parts such as capacitors, a heat-shrinkable tube made of polyvinyl chloride has been widely used. However, in the field where miniaturization and surface mounting of electronic parts such as capacitors are advanced to a large extent, the heat resistance is inadequate with such polyvinyl chloride tube.

For the heat-shrinkable tube for exterior covering of electronic parts such as capacitors, the following properties are required.

(a) When an electronic part such as a capacitor is shrink-covered with a heat-shrinkable tube, both open-end portions (sleeve portions) of the tube bend inwardly to cover the end surfaces of the electronic part. Each bent sleeve portion must uniformly and tightly fit on the end surface of the electronic part to present a good appearance. Namely, it is not desirable that the inner edge of the inwardly bent sleeve portion of the shrinked tube becomes bulky or stands up like a horn, or the sleeve portion curls without tightly fit on the end surface, thus presenting a poor outer appearance.

These states are illustrated by drawings. FIGS. 1 to 4 illustrate the states when a capacitor was shrink-covered with a heat-shrinkable tube, wherein reference numeral 1 indicates a capacitor, and numeral 2 indicates a cross sectional portion of the shrink-covered tube.

FIG. 1 represents a case of a tube having good finish, and FIGS. 2 to 4 represent cases of tubes having poor finish. In the case illustrated in FIG. 1, the inwardly bent sleeve portions of the shrinkable tube are uniformly fit on the end surfaces of the capacitor. Whereas, in the case illustrated in FIG. 2, the forward edges of the inwardly bent sleeve portions stand up like horns. In some cases, not only the forward edges, but the entire sleeve portions are likely to stand up. In the case illustrated in FIG. 3, the forward edges of the bent sleeve portions became bulky. In the case illustrated in FIG. 4, the bent sleeve portions are inwardly curled without being tightly fit on the end surfaces. In the conventional processings, such poor finish was often observed.

(b) After being applied to an electronic part, the shrinked tube is subjected to heat treatment for heat fixing. It is desired that during such heat treatment, the tube will not undergo cracking, or the tube will not undergo reshrinking.

(c) The discoloration of the tube is little even when the tube is held at 125° C. for 5,000 hours.

In order to improve the heat resistance, it has been proposed to employ a thermoplastic polyester resin as the material for a heat-shrinkable tube (Japanese Unexamined Patent Publications No. 32972/1974 and No. 100118/1980). However, such a tube does not fully satisfy the requirement (a) although it may satisfy the requirements (b) and (c) along the above requirements (a), (b) and (c). Therefore, it is desired to develop a thermoplastic polyester heat-shrinkable tube (hereinafter this may sometimes be referred to simply as a heat-shrinkable tube) which has these three essential properties.

SUMMARY OF THE INVENTION

The present inventors have conducted an extensive research to comply with such a desire and as a result, have succeeded in presenting a heat-shrinkable polyester tube of the present invention which is provided with the essential properties as specified in the above (a), (b) and (c).

Thus, the present invention provides a heat-shrinkable polyester tube, which is a tube having heat shrinkability imparted by subjecting an unstretched tube made of a thermoplastic polyester resin to tubular stretching, and which has a crystallinity of not higher than 20% and a shrinkage of more than 5% and not more than 26% in the longitudinal direction (MD) and a shrinkage of at least 25% in the radial direction (TD).

BRIEF DESCRIPTION OF THE DRAWINGS

In the accompanying drawings:

FIG. 1 illustrates a case in which the covering finish is good. Whereas, FIGS. 2, 3 and 4 illustrate cases wherein the covering finish is poor.

DESCRIPTION OF THE PREFERRED EMBODIMENTS

Figure 1:
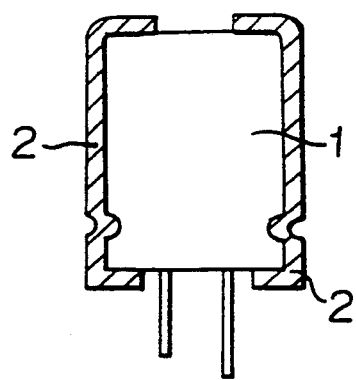
FIGS. 1 to 4 illustrate the states in which a capacitor is covered with a heat-shrinkable tube.
Figure 2:
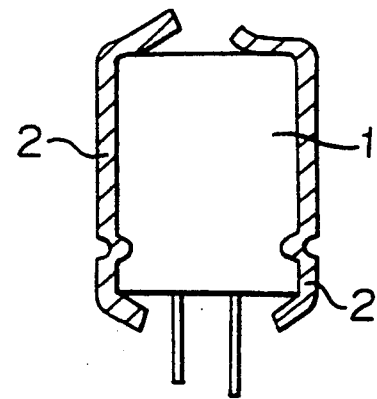
Figure 3:
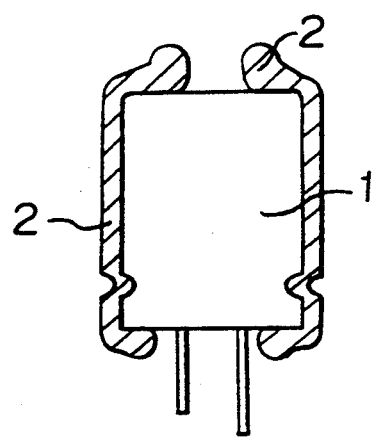
Figure 4:
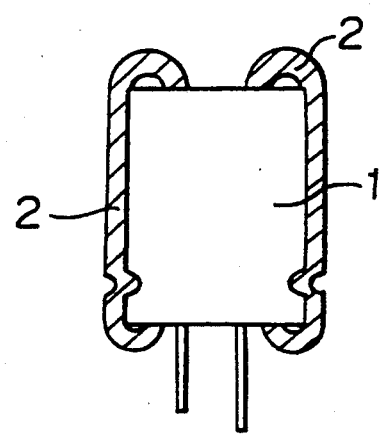

Now, the present invention will be described in detail with reference to the preferred embodiments.

The thermoplastic polyester resin constituting the tube of the present invention may be, in addition to a polyethylene terephthalate comprising terephthalic acid as the acid component and ethylene glycol as the glycol component, a copolymer having a dicarboxylic acid such as isophthalic acid mixed to the major amount of terephthalic acid as the acid component, or a copolymer having polyethylene glycol mixed to ethylene glycol as the glycol component, or a blend composition of such polyesters. As an example of a preferred polyester resin among them, a blend composition comprising (1) from 30 to 80% by weight of a polyester copolymer comprising from 65 to 95% by weight of terephthalic acid and from 5 to 35% by weight of isophthalic acid, as the acid component, and ethylene glycol as the glycol component, and (2) from 20 to 70% by weight of polyethylene terephthalate, may be mentioned. A heat-shrinkable tube made of this polyester blend composition preferably has a crystallinity of not higher than 12%. When a heat-shrinkable tube is prepared by using a blend material comprising (1) a polyester comprising a mixture of polyethylene glycol and ethylene glycol, as the glycol component, and terephthalic acid, or terephthalic acid and a small amount of isophthalic acid, as the acid component, and (2) a polyester containing polyethylene terephthalate as the main constituting component, such as a polyester comprising terephthalic acid, or terephthalic acid and a small amount of isophthalic acid, as the acid component and ethylene glycol as the glycol component, it is preferred that the crystallinity is adjusted to a level of not higher than 20%.

Further, when a polyethylene terephthalate having a relatively high intrinsic viscosity ($\eta$), e.g. ($\eta$)>1, is used as the main component, a merit will be obtained such that the dimensional stability of an unstretched tube immediately after the extrusion, will be improved, whereby the tube can easily be produced.

To the resin material for the tube of the present invention, an organic lubricant or an inorganic lubricant may be added to improve the slippage of the tube, and if necessary, additives such as a stabilizer, a colorant and an antioxidant, may be incorporated.

Now, a process for producing the tube of the present invention will be described. The polyester resin material as described above is dried by a conventional drier and then subjected to tubular extrusion to obtain an unstretched tube usually having a thickness of at most 300 $\mu$m. This unstretched tube is then subjected to tubular stretching in both the longitudinal direction (hereinafter referred to simply as MD) and in the radial direction (hereinafter referred to simply as TD). The stretching ratio here is from 1.01 to 1.4 times, preferably from 1.05 to 1.25 times, in MD and from 1.3 to 2.2 times, preferably from 1.4 to 2.0 times, in TD.

The stretching temperature should preferably be at a low level so long as no irregularity in the thickness occurs, and is usually preferably selected within a range of from 72° to 98° C.

The stretching method may be conventional tubular stretching, and the stretched tube may be wound up to obtain a product.

There is no particular restriction as to the thickness of the stretched tube thus obtained. However, as the shrinkable tube for electronic parts such as capacitors, a tube having a thickness of from 30 to 200 $\mu$m, preferably from 50 to 150 $\mu$m, is usually employed.

The shrinkage (as measured at 98°±2° C.) of the shrinkable tube thus obtained, is preferably more than 5% and not more than 26% in MD and at least 25% in TD.

If the shrinkage in MD is 5% or less, a space is likely to be formed between the sleeve portions of the shrinkable tube and the end surfaces of the capacitor, when the capacitor is covered with the heat-shrinkable tube. On the other hand, if it exceeds 26%, the heat-shrinking in the longitudinal direction is so much that the covering tends to be dislocated or deformed. On the other hand, if the shrinkage in TD is less than 25%, it tends to be difficult to accomplish tight fitting of the heat-shrinked tube when e.g. a capacitor is heat-covered with the tube, and loosening or relaxing of the covering tends to result. Preferably, the shrinkage in MD is not higher than 20%, and the shrinkage in TD is at least 28%. The shrinkage in TD is preferably set to be larger by at least 15% than the shrinkage in MD.

By conducting the tubular stretching under the above conditions and bringing the crystallinity of the stretched tube to be within a range of not higher than 20%, the exterior finish for an electronic part such as a capacitor can be remarkably improved (to obtain a finish free from a defect at the sleeve portions of the tube after shrinking, as mentioned above with respect to the essential property (a) for the heat-shrinkable tube), which can not be attained with conventional heat-shrinkable polyester tubes.

The reason for such improvement is not clearly understood. However, when the crystallinity level or the crystallinity distribution on the same circumferential plane is compared, with the tube of the present invention, the shrinking rate during the heat shrinking and the shrinked degree are well balanced. Accordingly, such improvement is considered to be attributable to the fact that the shrinking of both sleeve portions of the tube is conducted very uniformly on the same circumferential plane.

To adjust the crystallinity of the stretched tube to a level of not higher than 20%, it is preferred that the unstretched tube melt-extruded from an annular dies is rapidly quenched (for example to 20° C.) to control the crystallinity at a low level, and at the same time, the stretching ratio in MD is minimized to a level of not higher than 1.4 times, and after stretching, the stretched tube is brought in contact with a metal cylinder cooled to a temperature of from 15° to 30° C. for rapid quenching. Also here, it is preferred to control the growth of crystals.

The quenching after the stretching serves to prevent crystallization which lowers the shrinkage and thus is effective in that the shrinkage in MD will not be 5% or less. Further, it is effective for adjusting the shrinkage of the stretched tube to a level of more than 5% and not more than 26% to control the shrinkage in MD of the quenched unstretched tube to a level within a range of from 0 to 5%.

With the tube of the present invention, if the crystallinity level exceeds 20%, the uniformity in shrinking tends to be impaired (i.e. the sleeves of the tube tend to inwardly curl on the end surface of the article to be covered) such being undesirable.

By minimizing the stretching ratio as in the above described process, it is possible to use a thinner unstretched tube to obtain a stretched tube of the same diameter, whereby quenching after extrusion can be facilitated, and the crystallinity can be controlled to a low level.

Further, when the tube is heated from outside to a proper stretching temperature, the heating can uniformly be conducted to the inside, whereby surface roughening during stretching due to an inadequate temperature rise at the inside can be avoided, and consequently, a stretched tube excellent in the transparency and gloss can be obtained.

It is desired to minimize the fluctuation in the crystallinity of the tube (for example to a level of not higher than 3%) on the same circumferential plane. According to the present invention, it is possible to obtain a stretched tube having a small fluctuation in the crystallinity at a level of e.g. not higher than 3% (i.e. the difference between the maximum value and the minimum value in the crystallinity on the same circumferential plane) which has not been attained heretofore. This is believed attributable to the fact that by the use of a thinner stretched tube, quenching after extrusion can be conducted uniformly, whereby no fluctuation in the crystallinity occurs. Further, crystal growth due to stretching orientation is minimum, whereby the fluctuation in the crystallinity of the unstretched tube tends to be hardly enlarged.

As another property required for a heat-shrinkable tube for exterior covering of capacitors, such a tube is required to be clearly printed. For a polyester heat-shrinkable tube, it has been proposed to increase the surface (outer circumferential surface) wettability (i.e. to improve the affinity with e.g. a printing ink so that clear printing can be applied, and a printed ink can hardly be removed) by (a) applying corona discharge treatment to the surface of a heat-shrinkable polyethylene terephthalate tube, or (b) incorporating a polyalkylene glycol as the glycol component constituting the polyester.

However, according to the method (a), the surface wettability tends to be poor as time passes, and according to the method (b), if the polyalkylene glycol component is incorporated in a substantial amount to such an extent to satisfy the surface wettability, the resulting tube tends to be yellowed, and the color hue tends to deteriorate, and the mechanical strength tends to be low, whereby the properties of the polyester tube tend to be impaired.

The present inventors have found it possible to improve the surface wettability by a method for improving the printability of a heat-shrinkable polyester tube, which comprises applying a corona discharge treatment to the surface of a heat-shrinkable polyester tube made of a blend comprising a polyester containing polyethylene terephthalate as the main constituting component and a polyester copolymer containing polyethylene glycol as the glycol component, wherein the polyethylene glycol content in the polyester components in this tube is within a range of from 0.1 to 4% by weight (the polyethylene glycol content is represented by a), and a discharge energy of from 100 to 800 W-min/m² is applied to the surface of the tube for the corona discharge treatment (the applied discharge energy value is represented by b), and wherein the relation between the polyethylene glycol content a and thee discharge energy value b is represented by the formula:

$$b \geq e^{(1.2 - 5 \times 10^{3}a)}$$

where e is the base of natural logarithm.

The polyester to be used as the material for the tube of this embodiment is a mixture comprising (a) a polyester containing polyethylene terephthalate as the main constituting component, for example, a polyester comprising terephthalic acid, or terephthalic acid and a small amount of isophthalic acid, as the acid component, and ethylene glycol as the glycol component, and (b) a polyester copolymer containing polyethylene glycol as the glycol component (i.e. a polyester copolymer comprising polyethylene glycol and ethylene glycol as the glycol component, and terephthalic acid, or terephthalic acid and a small amount of isophthalic acid, as the acid component). An example of the composition of such a mixture is a blend comprising from 20 to 99.5% by weight of the polyester (a) and from 0.5 to 80% by weight of the polyester copolymer (b) which contains from 5 to 20% by weight of polyethylene glycol, whereby the blend ratio is selected so that the polyethylene glycol content in the composition will be from 0.1 to 4% by weight.

Thus, for the polyester mixture comprising (a) and (b) to be used as the material of the tube of this embodiment, it is essential that the polyethylene glycol content in the polyester components is from 0.1 to 4% by weight. To the polyester, additives such as an antioxidant, an ultraviolet absorber, a stabilizer, etc. are incorporated as the case requires. However, the above polyethylene glycol content is determined on the basis of the amount of the polyester mixture excluding such additives. If the amount of the polyethylene glycol is less than 0.1% by weight, the improvement in the surface wettability tends to be inadequate. On the other hand, if the amount of the polyethylene glycol exceeds 4% by weight, yellowing of the tube tends to be remarkable, and the mechanical strength and the heat stability tend to deteriorate.

Using the polyester mixture having the above described composition, as the material, a heat-shrinkable tube can be prepared by the same process as described above.

To the heat-shrinkable tube thus obtained, corona discharge treatment is applied over the entire circumferential surface. This treatment can be conducted in accordance with a conventional method commonly employed for the treatment of the surface of plastic products. In the present invention, the corona discharge treatment is applied so that a discharge energy of from 100 to 800 W-min/m² is applied to the tube surface. If the discharge energy in this treatment is less than 100 W-min/m², the wettability of the tube surface tends to be poor. If the content of polyethylene glycol is increased to improve the wettability, yellowing of the tube tends to be remarkable, and the mechanical strength and heat stability tend to deteriorate. On the other hand, if the discharge energy exceeds 800 W-min/m², an excess discharge energy will be applied to the tube, whereby the surface is likely to be melted. Consequently, the tube tends to be waved or undergo a dimensional change, such being undesirable.

Further, the relation between the polyethylene glycol content by weight % (a) and the discharge energy value (b) for the corona discharge treatment, is required to be represented by the formula:

$$b \geq e^{(1.2 - 5 \times 10^{-3}a)}$$

where e is the base of natural logarithm.

At the portion where $b < e^{(1.2 - 5 \times 10^{-3}a)}$, the wettability tends to be inadequate.

This method is effective not only for the tubes for exterior covering of capacitors but also for tubes to be used for other purposes, on which printing is to be applied, or for polyester heat-shrinkable tubes with the crystallinity or the shrinkage being outside the above described range.

Now, the present invention will be described in further detail with reference to Examples and Comparative Examples. However, it should be understood that the present invention is by no means restricted to such specific Examples.

In the following Examples and Comparative Examples, various properties were measured as follows:

(1) Shrinkage: The sample was immersed in hot water of 98° C. ±2° C. for 10 seconds, and then the shrinkage was calculated in accordance with the following formula:

$$\text{Shrinkage } (\%) = \frac{L0 - L1}{L0} \times 100$$

where L0 is length before shrinking, and L1 is length after shrinking.

(2) Crystallinity: In accordance with a density gradient tube method. The crystallinity $X_c$ was calculated in accordance with the following formula:

$$X_c = \frac{d - 1.335}{1.455 - 1.335} \times 100 \, (\%)$$

where 1.335 is the density of amorphous polyethylene terephthalate, 1,455 is the density of crystalline polyethylene terephthalate, and d is the density of the tube measured.

(3) Crystallinity on the same circumferential plane: Samples were collected from 8 to 10 places on the same circumferential plane, and the crystallinity of each sample was measured. With respect to a tube having a large diameter, the number of samples collected was increased. Whereas, with the tube having a small diameter, the number of samples collected was decreased. In the Tables showing the results of measurement in Examples, for example, 4–6% indicates that among the samples collected on the same circumferential plane, the lowest crystallinity was 4%, and the highest crystallinity was 6%.

(4) Tensile strength: In accordance with JIS C-2132.
(5) Elongation: In accordance with JIS C-2132.
(6) Heat cracking resistance: A tube was put on a capacitor. Then, needle No. 8 was driven into the body of the capacitor with a force of 0.94 kgf to form a hole in the tube. This capacitor was left in an air oven of 150° C. for 10 minutes to examine enlargement of the hole. In Table 2, for example, 0/30 is given, whereby the dominator indicates the number of tested samples, and the numerator indicates the number of samples with enlarged holes.
(7) Finishing: After a tube is put on a capacitor, the presence or absence of a defect such as bulky edge, standing up of a horn or inward winding due to curling, at both ends (sleeve portions) of the tube, was visually observed, whereby symbol × indicates that such a defect is clearly observed, symbol ○ indicates that such a defect is very slight, and symbol ⊚ indicates that no such a defect is observed.

EXAMPLES 1 TO 6

A mixture comprising 60% by weight of a polyester copolymer having an intrinsic viscosity ($\eta$) of 0.85, which contains 75% by weight of terephthalic acid and 25% by weight of isophthalic acid as the acid component and ethylene glycol as the alcohol component, and 40% by weight of polyethylene terephthalate having an intrinsic viscosity ($\eta$) of 0.66, was dried by means of a drier and then subjected to tubular extrusion to obtain an unstretched tube having the thickness ($\mu$m) as identified in Table 1.

This unstretched tube was subjected to tubular stretching at a temperature of 85° C. at the stretching ratio (times) in MD and TD as identified in Table 1, to obtain a stretched tube having a thickness of 90 $\mu$m in each of Examples 1 to 6. The shrinkage (%) in MD and TD and the crystallinity on the same circumferential plane of the stretched tube in each Example, are shown in Table 1. Further, the tensile strength (kg/cm$^2$) and the elongation (%) of the tube obtained in each Example, and the evaluation of the finishing and the heat cracking resistance when a capacitor was covered with such a tube, are shown in Table 2.

TABLE 1

| | Thickness of the unstretched tube ($\mu$m) | Stretching ratio (times) | | Shrinkage (%) | | Crystallinity on the same circumferential plane (%) |
|---|---|---|---|---|---|---|
| | | MD | TD | MD | TD | |
| Example 1 | 127 | 1.01 | 1.4 | 1.0 | 29 | 4–6 |

TABLE 1-continued

| | Thickness of the unstretched tube ($\mu$m) | Stretching ratio (times) | | Shrinkage (%) | | Crystallinity on the same circumferential plane (%) |
|---|---|---|---|---|---|---|
| | | MD | TD | MD | TD | |
| Example 2 | 132 | 1.05 | 1.4 | 5 | 29 | 4–6 |
| Example 3 | 165 | 1.15 | 1.6 | 13 | 38 | 5–7 |
| Example 4 | 187 | 1.30 | 1.6 | 23 | 38 | 5–7 |
| Example 5 | 216 | 1.20 | 2.0 | 17 | 50 | 5–7 |
| Example 6 | 257 | 1.30 | 2.2 | 23 | 55 | 9–12 |

TABLE 2

| | Tensile strength (kg/cm$^2$) | Elongation (%) | Finishing | Heat cracking resistance |
|---|---|---|---|---|
| Example 1 | 802 | 438 | ○ | 0/30 |
| Example 2 | 808 | 435 | ○ | 0/30 |
| Example 3 | 825 | 425 | ⊚ | 0/30 |
| Example 4 | 830 | 420 | ⊚ | 0/30 |
| Example 5 | 855 | 410 | ⊚ | 0/30 |
| Example 6 | 910 | 390 | ○ | 0/30 |

EXAMPLES 7 TO 11

A polyester mixture having the same composition as used in Example 1 was dried by means of a drier and then subjected to tubular extrusion to obtain an unstretched tube having the thickness as identified in Table 3. This unstretched tube was subjected to tubular stretching at a temperature of 95° C. at a stretching ratio of 1.1 times in MD and 1.5 times in TD, to obtain a stretched tube having the thickness as identified in Table 3. Using this stretched tube, heat-shrink covering of a capacitor was conducted. The finishing of the covered product is shown in Table 3.

TABLE 3

| | Thickness of the unstretched tube ($\mu$m) | Thickness of the tube after stretching ($\mu$m) | Crystallinity on the same circumferential plane (%) | Finishing |
|---|---|---|---|---|
| Example 7 | 50 | 30 | 4–6 | ⊚ |
| Example 8 | 130 | 80 | 4–6 | ⊚ |
| Example 9 | 165 | 100 | 4–6 | ⊚ |
| Example 10 | 250 | 150 | 5–7 | ⊚ |
| Example 11 | 230 | 200 | 5–7 | ⊚ |

EXAMPLES 12 TO 17

In these Examples, the following polyester blend composition was used as the tube material. Namely, a blend composition comprising 67% by weight of polyethylene terephthalate having an intrinsic viscosity ($\eta$) of 1.2, 28% by weight of polyethylene terephthalate having an intrinsic viscosity ($\eta$) of 0.66 and 5% by weight of a polyester copolymer having an intrinsic viscosity ($\eta$) of 0.74 comprising ethylene glycol and polyethylene glycol as the alcohol components and terephthalic acid as the acid component (i.e. 10% by weight of polyethylene glycol, the rest being other components), was used as the material.

This polyester blend composition was dried by means of a drier and then subjected to tubular extrusion to obtain an unstretched tube having the thickness ($\mu$m) as identified in Table 4.

This unstretched tube was subjected to tubular stretching at a temperature of 90° C. in the stretching ratio (times) in MD and TD as identified in the following Table 4 to obtain a stretched tube having the thickness (μm) as identified in Table 4. The shrinkage (%) in MD and TD and the crystallinity on the same circumferential plane of the stretched tube in each Example are shown in Table 4. Further, the tensile strength (kg/cm²) and the elongation (%) of the tube obtained in each of Examples 12 to 17, and evaluation of the finishing and the heat cracking resistance, when a capacitor was covered with such a tube, are shown in Table 5.

COMPARATIVE EXAMPLES 1 AND 2

Using the polyester blend composition as used in Example 12, heat-shrinkable tubes were prepared in the same manner as in Example 12 except that the thickness of the unstretched tube, the stretching ratio in MD and TD of the tube during the stretching operation and the thickness of the stretched tube thereby obtained were changed as shown in Table 4. The shrinkage in MD and TD and the crystallinity of each heat-shrinkable tube thereby obtained are shown in Table 4, and the tensile strength, the elongation and the finishing and the heat cracking resistance of each tube as covered on a capacitor are shown in Table 5.

TABLE 4

|  | Thickness of the unstretched tube (μm) | Thickness of the stretched tube (μm) | Stretching ratio (times) MD | TD | Shrinkage (%) MD | TD | Crystallinity on the same circumferential plane (%) |
|---|---|---|---|---|---|---|---|
| Example 12 | 145 | 100 | 1.05 | 1.4 | 5 | 29 | 7–9 |
| Example 13 | 177 | 100 | 1.10 | 1.6 | 9 | 38 | 9–11 |
| Example 14 | 192 | 100 | 1.15 | 1.7 | 13 | 41 | 11–13 |
| Example 15 | 211 | 100 | 1.20 | 1.8 | 17 | 44 | 13–15 |
| Example 16 | 231 | 100 | 1.25 | 1.9 | 20 | 47 | 15–17 |
| Example 17 | 256 | 100 | 1.35 | 2.0 | 26 | 50 | 18–20 |
| Comparative Example 1 | 352 | 60 | 2.3 | 2.4 | 45 | 46 | 18–28 |
| Comparative Example 2 | 748 | 60 | 3.4 | 3.4 | 50 | 50 | 20–36 |

TABLE 5

|  | Tensile strength (kg/cm²) | Elongation (%) | Finishing | Heat cracking resistance |
|---|---|---|---|---|
| Example 12 | 945 | 415 | ◯ | 0/30 |
| Example 13 | 962 | 396 | ⊚ | 0/30 |
| Example 14 | 976 | 387 | ⊚ | 0/30 |
| Example 15 | 985 | 374 | ⊚ | 0/30 |
| Example 16 | 998 | 367 | ⊚ | 0/30 |
| Example 17 | 1014 | 358 | ◯ | 0/30 |
| Comparative Example 1 | 1925 | 80 | X | 0/30 |
| Comparative Example 2 | 2205 | 71 | X | 0/30 |

The heat-shrinkable tube of the present invention, additionally exhibits the following specific physical property.

A polyester film constituting a heat-shrinkable tube usually shows a phenomenon such that it bends due to the difference in stress between the inside and the outside of the tube, and the bending tends to be remarkable when it is left in a high temperature atmosphere. The polyester film constituting the heat-shrinkable tube of the present invention bends when left to stand in an atmosphere of 100° C. ±2° C. (for example, in an air oven) for 5 minutes, but its curvature has been found to be not higher than 0.2. In other words, the bending degree is small.

The films constituting the heat-shrinkable tubes obtained in Example 14 and Comparative Example 2 were left to stand in an air oven of 100° C. ±2° C. for 5 minutes and then their curvatures were measured and found to be 0.0461 and 0.452, respectively.

Figure 5:
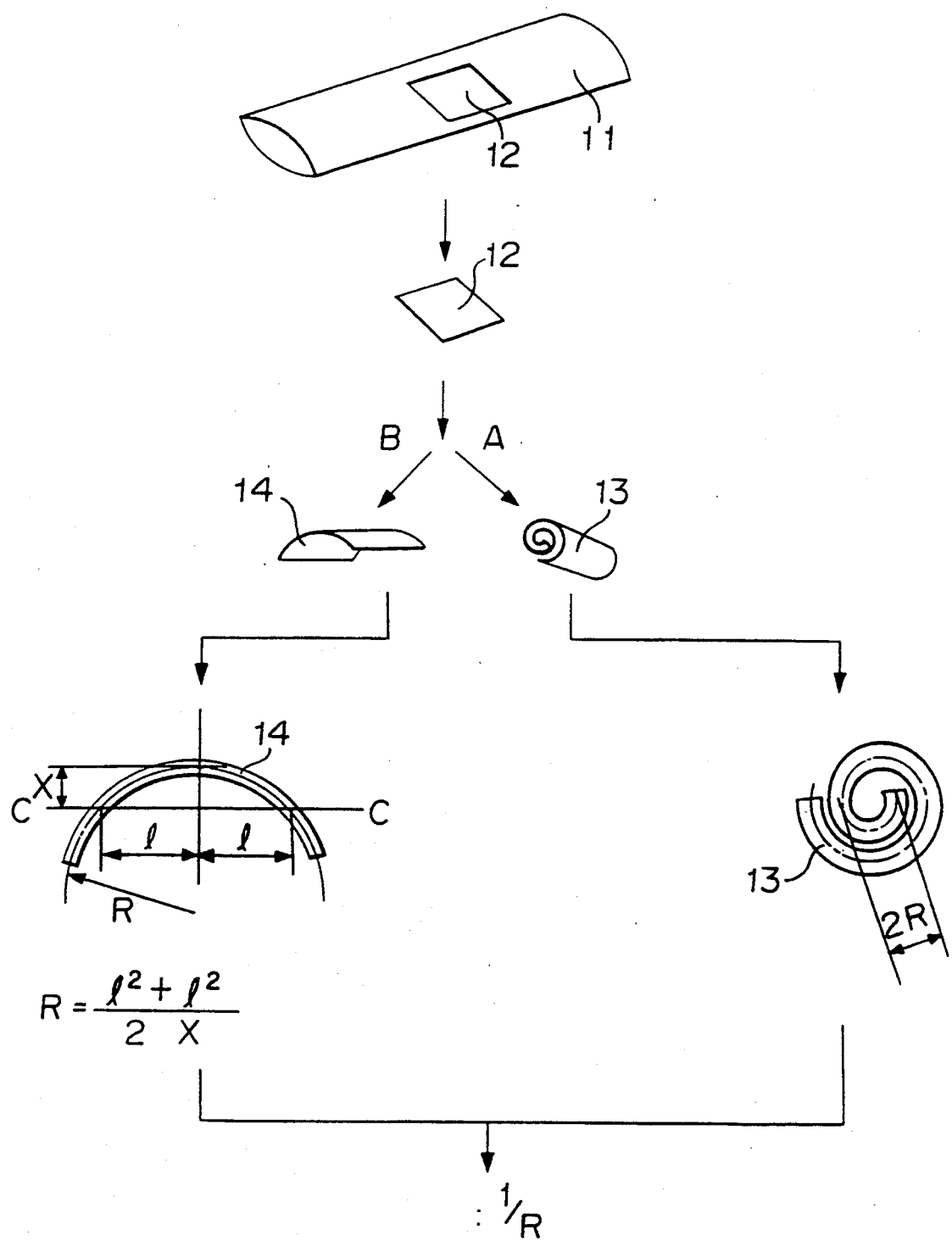
FIG. 5 illustrates a method in which a heat-shrinkable tube of the present invention is heated to a predetermined temperature, and the curvature is measured.

The curvature was measured as follows. FIG. 5 illustrates the method for obtaining the curvature. In the Figure, reference numeral 11 indicates a heat-shrinkable tube to be measured, and a square sample 12 is cut out from the tube avoiding the folding lines. The size of this sample may optionally be selected, since the size does not affect the measurement of the curvature. Usually, the sample is a square with each side having a length corresponding to from 50 to 90% of the folded diameter of the tube. The sample 12 bends when left to stand in an atmosphere of 100° C. ±2° C. for 5 minutes. As a result, as roughly classified, there will be the one which advances in the direction of arrow A and forms a spiral 13 and the one which advances in the direction of arrow B and merely forms an arc 14. With respect to the spiral sample 13, the diameter of a circle constituting the innermost cylinder is measured and designated as 2R. With respect to the arc sample 14, optional positions of this arc are connected by a straight line C-C, and the value l and the value X as shown in the Figure are measured, whereupon the value R is obtained by the formula:

$$R = \frac{l^2 + X^2}{2X}$$

The curvature is obtained by 1/R.

As described above, the heat-shrinkable tube of the present invention has a value of curvature smaller than the tubes of the Comparative Examples. Accordingly, when a capacitor is covered with such a tube, the finish on each end surface will not be adversely affected by the bending, and as shown in the above Table 4, good finish will be obtained.

EXAMPLES 18 TO 23 AND COMPARATIVE EXAMPLE 3

Composition of the Tube Material

A mixture comprising polyethylene terephthalate (component A in the following Table 6) in a weight proportion as identified in Table 6 and a polyester copolymer (component B in the following Table 6) comprising ethylene glycol and polyethylene glycol as the glycol component (comprising 90% by weight of ethylene glycol and 10% by weight of polyethylene glycol) and terephthalic acid as the acid component, was used as the material for the preparation of the tube. The polyethylene glycol content in the polyester mixture constituting the tube is also shown in Table 6.

TABLE 6

|  | Component A (wt %) | Component B (wt %) | Polyethylene glycol (wt %) |
|---|---|---|---|
| Example 18 | 99 | 1 | 0.1 |
| Example 19 | 98 | 2 | 0.2 |
| Example 20 | 95 | 5 | 0.5 |
| Example 21 | 90 | 10 | 1.0 |
| Example 22 | 80 | 20 | 2.0 |
| Example 23 | 60 | 40 | 4.0 |
| Comparative Example 3 | 20 | 80 | 8.0 |

Preparation of the Heat-Shrinkable Tube

Each of seven types of materials shown in Table 6 was dried by means of a drier and then subjected to tubular extrusion to obtain an unstretched tube having a folded diameter of 8.2 mm and a thickness of 190 μm. This unstretched tube was subjected to tubular stretching at a stretching temperature of 90° C. at a stretching ratio of 1.15 times in MD and 1.7 times in TD to obtain a stretched tube having a folded diameter of 13.8 mm and a thickness of 100 μm.

Corona Discharge Treatment

Each of seven types of tubes prepared as described above, was flattened and supplied to a corona discharge treatment apparatus, whereupon discharge treatment was applied to the entire circumferential surface of the tube. This treatment was conducted by adjusting the discharge energy to a level of 100, 200, 400, 600 and 800 W-min/m² (0 indicates a case where no discharge treatment was conducted) as shown in Table 7. With respect to each tube thus obtained, the surface wettability and the color of the tube were examined.

The surface wettability was measured as follows.

On the surface of the flattened tube, a wettability index standard solution of 52 dyne/cm was coated in a square area with each side having a length corresponding to the width of the flattened tube. As such a coating solution, "Wettability Index Standard Solution for Wettability Test", tradename, manufactured by Wako Junyaku Kogyo K.K. (components: ethylene glycol and monoethyl ether) was used. Two minutes after coating the above solution, the area occupied by the wettability index standard solution on the tube surface was confirmed, and depending upon the degree of the area, the wetted state was evaluated by the following rankings.

| Wetted area | Wetted state | |
|---|---|---|
| At least 90% | Good | ○ |
| 50–90% | Slightly inferior | Δ |
| Less than 50% | Inferior | X |

The color of the tube was visually observed and evaluated by the following rankings. ○: good, Δ: slightly yellowed, X: substantially yellowed.

The results of the evaluation of the surface wettability and the color of the tube are shown in Table 7.

TABLE 7

| No. | Polyethylene glycol content (a) (wt %) | Wettability of corona discharge treatment (b) | | | | | | Color of the tube |
|---|---|---|---|---|---|---|---|---|
| | | 0 | 100 W·min/m² | 200 W·min/m² | 400 W·min/m² | 600 W·min/m² | 800 W·min/m² | |
| 1 | 0.1 | X | Δ | Δ | Δ | Δ | ○ | ○ |
| 2 | 0.2 | X | Δ | Δ | Δ | ○ | ○ | ○ |
| 3 | 0.5 | X | Δ | Δ | ○ | ○ | ○ | ○ |
| 4 | 1.0 | X | Δ | ○ | ○ | ○ | ○ | ○ |
| 5 | 2.0 | X | ○ | ○ | ○ | ○ | ○ | ○ |
| 6 | 4.0 | Δ | ○ | ○ | ○ | ○ | ○ | ○ |
| 7 | 8.0 | ○ | ○ | ○ | ○ | ○ | ○ | X |

In Table 7, among those wherein the polyethylene glycol content in the tube is from 0.1 to 4.0% by weight and the discharge energy in the corona discharge treatment is within a range of from 100 to 800 W-min/m², the ones wherein the relation between the polyethylene glycol content by weight % a and the discharge energy value b, satisfies the formula:

$$b \geq e^{(1.2 - 5 \times 10 - 3a)}$$

are Examples of the present invention, wherein both the wettability and the color of the tube are evaluated to be ○.

On the other hand, in the case where no corona discharge treatment was applied (0), when the polyethylene glycol content is from 0.1 to 4.0% by weight, the wettability is X or Δ, and when it was 8.0% by weight, the wettability is ○, but the color of the tube is X. Further, even when the corona discharge treatment was applied, if the above formula is not satisfied, i.e. if a is from 0.1 to 1.0% by weight when b is 100 W-min/m², if a is from 0.1 to 0.5% by weight when b is 200 W-min/m², if a is from 0.1 or 0.2% by weight when b is 400 W-min/m², or if a is from 0.1% by weight when b is 600 W-min/m², the wettability is inadequate as represented by Δ.

As described in the foregoing, the heat-shrinkable tube of the present invention has a relatively low crystallinity at a level of from 4 to 20%. Generally speaking, when the crystallinity of a polyester is high (for example at least 30%), the solvent resistance is good, and when the crystallinity is low, the solvent resistance is poor. When a capacitor is covered with a heat-shrinkable tube, washing with a solvent (such as acetone) is sometimes conducted after covering. When such washing with a solvent is conducted, with the one covered by the heat-shrinkable tube of the present invention, a problem may occur such that the tube will undergo cracking, or irregularities are formed on the surface to impair the outer appearance. To avoid formation of such a defect, the article (such as a capacitor, hereinafter the description will be made with respect to covering of a capacitor as an example) covered with the heat-shrinkable tube of the present invention, is left to stand in a high temperature atmosphere of from 100 to 400° C. for from 10 seconds to one hour to increase the crystallinity of the tube to a level of at least 30%.

A case wherein this treatment was actually conducted, will now be described.

A capacitor was covered with the heat-shrinkable tube having a crystallinity of from 11 to 13 (average value: 12) obtained in Example 14, and an experiment of heat treatment in a high temperature atmosphere of 200° C. for from 30 to 120 seconds and an experiment of heat treatment in a high temperature atmosphere of 300° C. for from 10 to 70 seconds were conducted, whereby the crystallinity (average value) and the solvent resistance of the tube were examined. The results of the measurement are shown in Table 8. For the solvent resistance, the sample was completely immersed in acetone of from 20° to 25° C. for 30 seconds under a standing still condition and then gently taken out, and the state of the surface of the tube was examined. The results were evaluated in accordance with the following standards.

○ indicates that no cracking or surface irregularity was observed. Δ indicates that out of 100 products, the number of good products having no defect is at least 30% excluding those having any crack or surface irregularity as defective products. × indicates that cracking or surface irregularities are observed on the entire surface of the product.

TABLE 8

| Heat treatment at 200° C. | | | Heat treatment at 300° C. | | |
|---|---|---|---|---|---|
| Heat treating time (sec) | Crystallinity (%) | Solvent resistance | Heat treating time (sec) | Crystallinity (%) | Solvent resistance |
| 30 | 13 | × | 10 | 13 | × |
| 60 | 17 | ×~Δ | 30 | 27 | ×~Δ |
| 70 | 29 | ×~Δ | 40 | 32 | ○ |
| 80 | 34 | ○ | 50 | 33 | ○ |
| 90 | 34 | ○ | 60 | 32 | ○ |
| 120 | 34 | ○ | 70 | 33 | ○ |

As described above, with a product covered with the heat-shrinkable tube of the present invention, the solvent resistance can be improved by increasing the crystallinity of the tube. Further, the dimensional stability after finishing can also be increased by the increase of the crystallinity.

As described in the foregoing, with a heat-shrinkable tube using a thermoplastic polyester resin as the material, when heat-shrink covering is conducted, a defect such as a bulky forward edge, standing up of the forward edge like a horn or inward curling of the forward edge without being tightly fit, is frequently observed at the sleeve portions i.e. at both open ends of the tube. With the heat-shrinkable tube of the present invention, no such a defect will be formed, and excellent covering finish can be obtained.

We claim:

1. A method for improving the printability of a heat-shrinkable polyester tube, which comprises applying a corona discharge treatment to a surface of a heat-shrinkable polyester tube made of a blend comprising 20–99.5% by weight of a polyester containing polyethylene terephthalate and 0.5%–80% by weight of a polyester copolymer containing polyethylene glycol as the glycol component, wherein the polyethylene glycol content in the polyester co-polymer is within a range of from 0.1 to 4% by weight (the polyethylene glycol content is represented by a), and a discharge energy of from 100 to 800 W.min/m² is applied to the surface of the tube for the corona discharge treatment (the applied discharge energy value is represented by b), and wherein the relation between the polyethylene glycol content a and the discharge energy value b is represented by the formula:

$$b \geq e^{(1.2 - 5 \times 10^3 a)}$$

where e is the base of natural logarithm, whereby the printability of the heat-shrinkable polyester tube is improved.

* * * * *